(No Model.) 4 Sheets—Sheet 1.
A. W. JOHNSON.
RUNNING GEAR FOR VEHICLES.
No. 396,494. Patented Jan. 22, 1889.
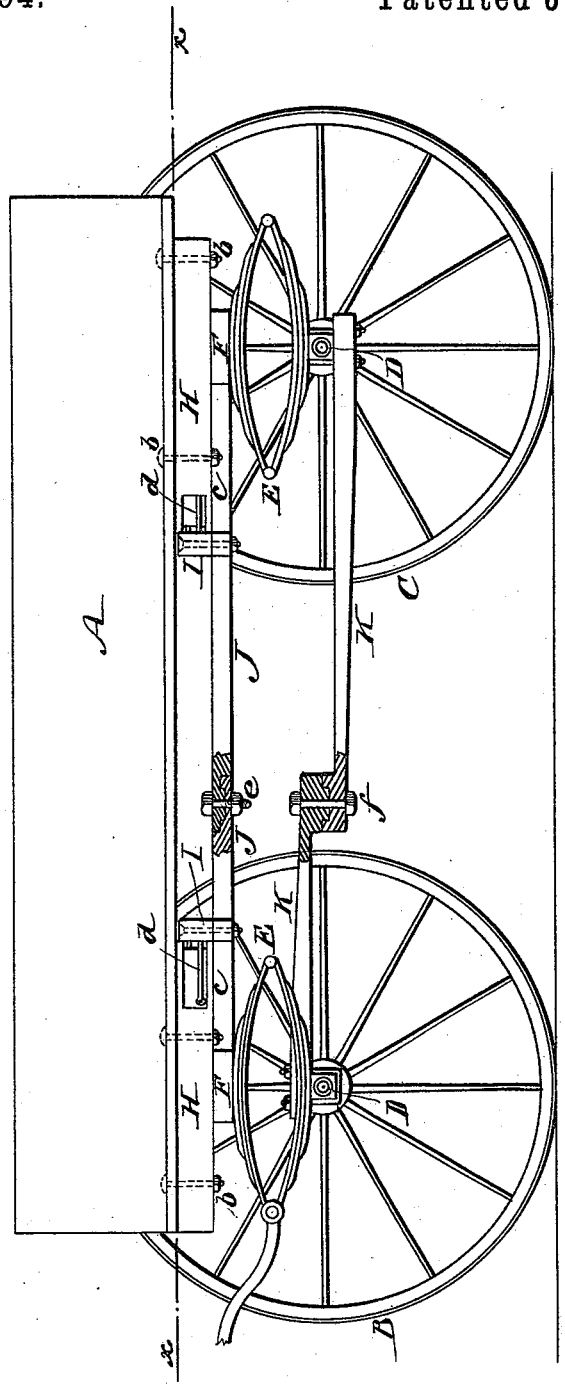
WITNESSES:
INVENTOR:
A. W. Johnson
BY Munn & Co.
ATTORNEYS.

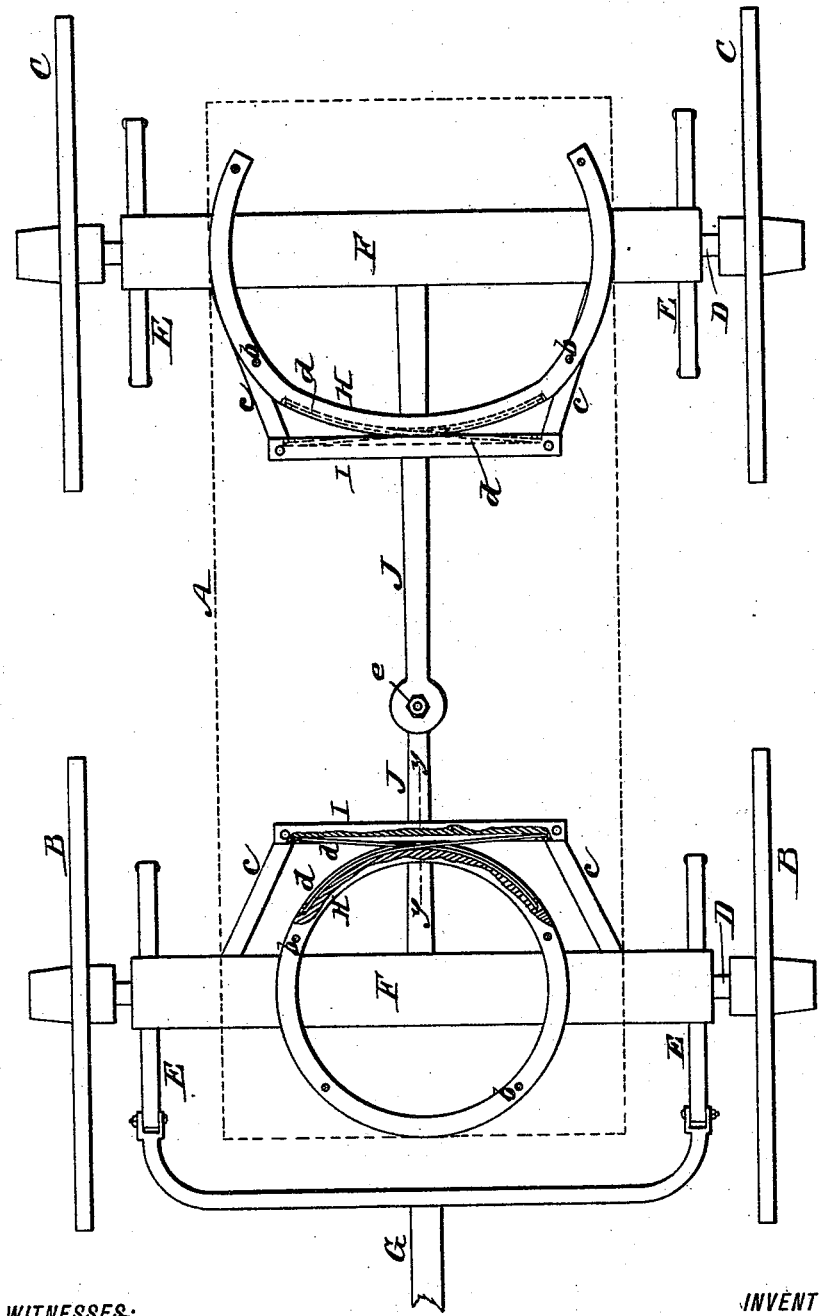

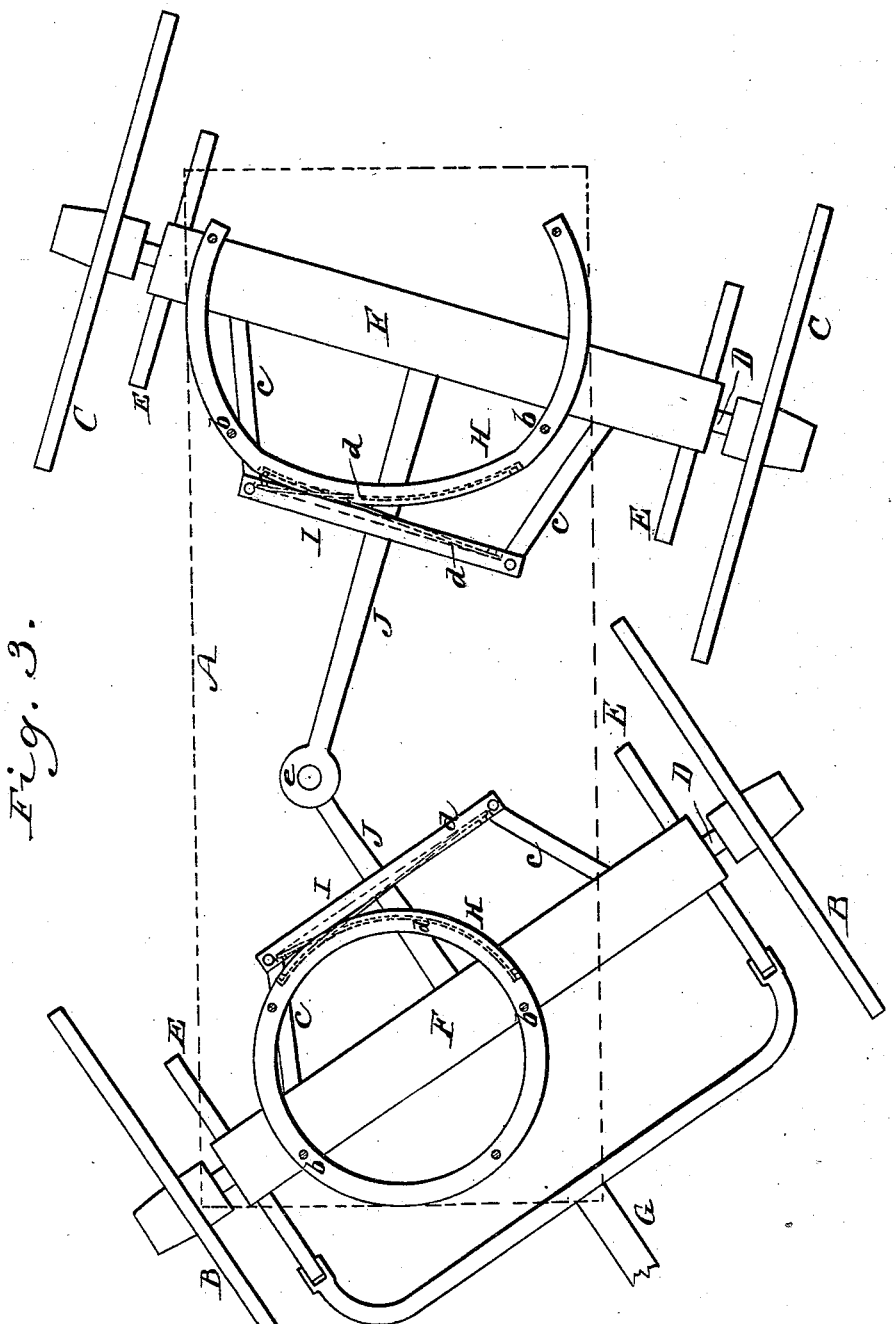

(No Model.) 4 Sheets—Sheet 4.

A. W. JOHNSON.
RUNNING GEAR FOR VEHICLES.

No. 396,494. Patented Jan. 22, 1889.

WITNESSES:
INVENTOR:
A. W. Johnson
BY
Munn & Co.
ATTORNEYS.

UNITED STATES PATENT OFFICE.

ALFRED W. JOHNSON, OF NEW BRUNSWICK, NEW JERSEY.

RUNNING-GEAR FOR VEHICLES.

SPECIFICATION forming part of Letters Patent No. 396,494, dated January 22, 1889.

Application filed September 7, 1888. Serial No. 284,774. (No model.)

*To all whom it may concern:*

Be it known that I, ALFRED W. JOHNSON, of New Brunswick, in the county of Middlesex and State of New Jersey, have invented a new and useful Improvement in Axle and Body Connections of Wagons and other Wheel Vehicles, of which the following is a full, clear, and exact description.

This invention consists in a novel connection and certain details or combinations of details thereof between the bodies and swiveling axles of wagons and other wheel vehicles, substantially as hereinafter described, and pointed out in the claims, whereby when cranking the axles or either of them, as on turning the vehicle having two or a series of axles, the center portions of the axles in direction of their length are brought closer together or moved farther apart, and the whole space between the wheels is utilized for cranking by sliding the body of the vehicle over. King-bolts are dispensed with and numerous advantages are secured, as hereinafter set forth.

Reference is to be had to the accompanying drawings, forming a part of this specification, in which similar letters of reference indicate corresponding parts in all the figures.

Figure 5:
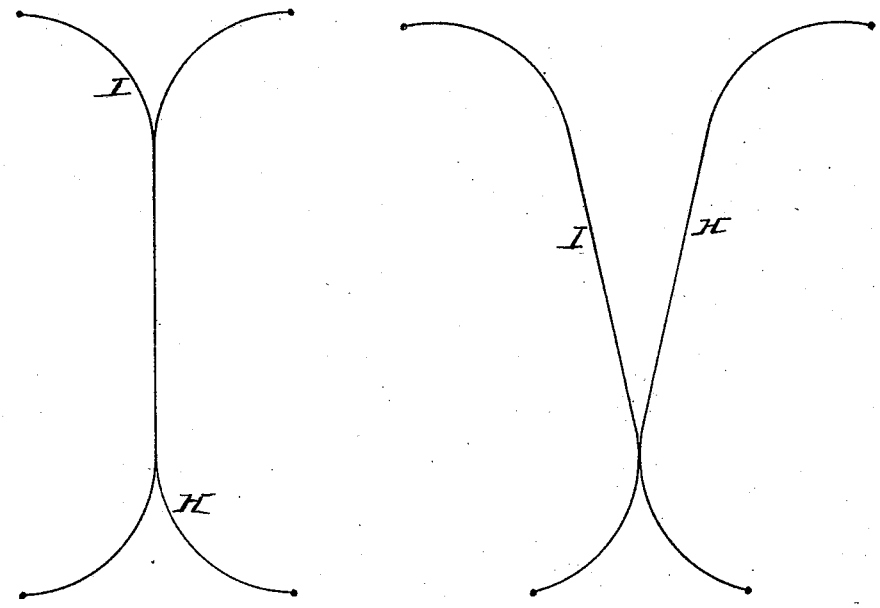
Figure 6:
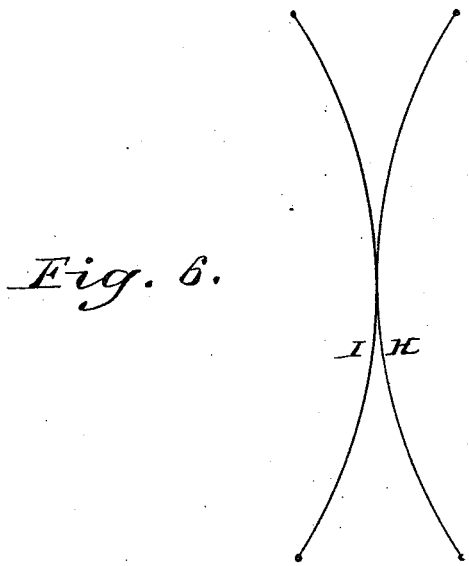

Figure 1 represents a side elevation of a four-wheel vehicle or wagon having my invention applied and in which both axles are arranged to swivel or crank. Fig. 2 is an upper sectional plan view of the same upon the line $x$ $x$ in Fig. 1, showing the body of the wagon by dotted lines and representing the axles as parallel with one another or not cranked; and Fig. 3, a similar view with the axles cranked or swiveled, as on turning the vehicle. Fig. 4 is a vertical section in part upon the line $y$ $y$ in Fig. 2; and Figs. 5 and 6 are diagrams representing modified configurations of certain details, as hereinafter described.

A indicates the body of the wagon, which body may be of the ordinary or any suitable construction, and which is supported or carried by two pairs of wheels, B B representing the front pair, and C C the rear pair. D D are the axles of said wheels, upon which the body A is loosely mounted, subject to the interposition of springs E E, so as to permit of said body sliding laterally over said axle when the axles are cranked or swiveled, as illustrated, for instance, in Fig. 3. A like action of the body, but in a reverse direction, takes place when the axles are cranked or swiveled in a reverse direction.

The springs E E, which are here shown as double elliptic ones, but which may be of any suitable kind, rest on and are secured to the axles D D, and are secured above to cross-beams F F parallel with the axles, but loose from the body A.

The shafts, draft-bar, or pole G, as the case may be, is secured to the front axle in any suitable way, but preferably through the interposition of the forward pair of springs.

Secured to the body A, beneath it, as by bolts $b$ $b$, or otherwise, are rope or chain carriers H H, which loosely rest upon the beams F F, and so cause the body A to be carried by the springs E E. These body-attached rope or chain carriers H are designed to work in connection with other rope or chain carriers, I I, which are connected with the loose cross-beams F F—as, for instance, by braces $c$ $c$, or otherwise—and thereby virtually or indirectly with the axles. Both sets of carriers H I are in the same plane, and preferably in such close proximity to each other—that is, each carrier H with its corresponding carrier I—that they are free to roll over or against one another, and said carriers are connected with one another by crossing flexible connections $d$, which may either be ropes, straps, or chains, but preferably wire ropes arranged to work within grooves in the meeting or approximate surfaces of the carriers, and connected at their opposite ends, respectively, with the opposite ends of the grooves in the carriers H I, and crossing in between said ends, as shown in Figs. 2 and 3. The carriers H and I are thus tied together in an independent free or rolling manner. The meeting or opposing faces of said carriers may either be partially straight and partially curved, as shown in Fig. 5, wholly curved, as shown in Fig. 6, or one—as, for instance, the working-face of H—curved and the other—as, for instance, the working-face of I—straight; or they may be of any other suitable configuration. The carriers I I and cross-beams F F carrying them are connected with each other—that is, when both axles are made to swivel or crank—by a divided bar or rod, J, having its sections jointed together, as at e, and to stiffen or strengthen the working connection the axles D D are similarly connected by a divided rod or bar, K, having its sections jointed together, as at f, in line with the joint e. Of course when only one axle is designed to swivel, these connections will be different; but in every case the swiveling axle will be loose from the body of the vehicle, and a rope or like flexible connection be made by means of independent rope-carriers between the body and axle, and in the arrangement here shown the connections J and K may have other suitable connections substituted for them or for either of them without changing the distinguishing character of my invention.

By reference to the drawings, and more particularly to Fig. 3 thereof, it will readily be seen that when turning the vehicle or cranking or swiveling its axle the distance between the center portions of the axles will be increased or diminished, and that the whole space between the wheels and the body of the vehicle may be utilized for cranking by the sliding of the body over. The usual fifth-wheel and king-bolts are dispensed with, and the vehicle will run true over rough roads, as depressions and obstructions in the road will not cause the axles to wriggle, because the axles will be drawn together by such tendency. Increased facility will be afforded for getting in and out of the vehicle by the wheels being out of the way, and, while the whole is of a durable character, the vehicle may be cranked or turned in a very short space, even though the same have large wheels and a broad and low body, inasmuch as there is no occasion for the wheels to pass under the body.

Having thus described my invention, what I claim as new, and desire to secure by Letters Patent, is—

1. In wagons and other vehicles having swiveling axles, the swiveling axle or axles arranged loosely beneath the body of the vehicle and adapted to admit of said body moving laterally over such axle or axles, in combination with rope or chain carriers attached the one to the body over the swiveling axle and the other connected with the adjacent axle, and crossing flexible connections uniting said carriers, substantially as specified.

2. In wagons and other vehicles having swiveling axles D D, the combination of the body A, arranged loosely over said axles, the rope or chain carriers H H, secured to the under side of said body over the axles, the flexibly-connected cross-beams F F, loose from the body and arranged over the axles, springs connecting said cross-beams with the axles, rope or chain carriers I I, connected with said cross-beams, and the crossing rope or flexible connections d, uniting the carriers H and I, essentially as herein set forth.

3. The combination of the swiveling axles D D, the body A, arranged loosely over said axles, the rope or chain carriers H H, secured to the under side of said body over the axles, the cross-beams F F, loose from the body and arranged over the axles, springs connecting said cross-beams with the axles, rope or chain carriers I I, connected with said cross-beams, the crossing rope or flexible connections d d, uniting the carriers H and I, and separate laterally-flexible connections between said cross-beams and said axles, respectively, substantially as described.

ALFRED W. JOHNSON.

Witnesses:
HENRY B. BLAINE,
WILLIAM P. C. RAPPLYEA.